Jan. 5, 1954   D. E. ANDERSON   2,664,871
SUPPLEMENTAL FUEL FEED DEVICE
Filed July 30, 1949   2 Sheets-Sheet 1

Inventor
David E. Anderson
By The Firm of Charles H. Wills Att'ys

Jan. 5, 1954     D. E. ANDERSON     2,664,871
SUPPLEMENTAL FUEL FEED DEVICE
Filed July 30, 1949     2 Sheets-Sheet 2
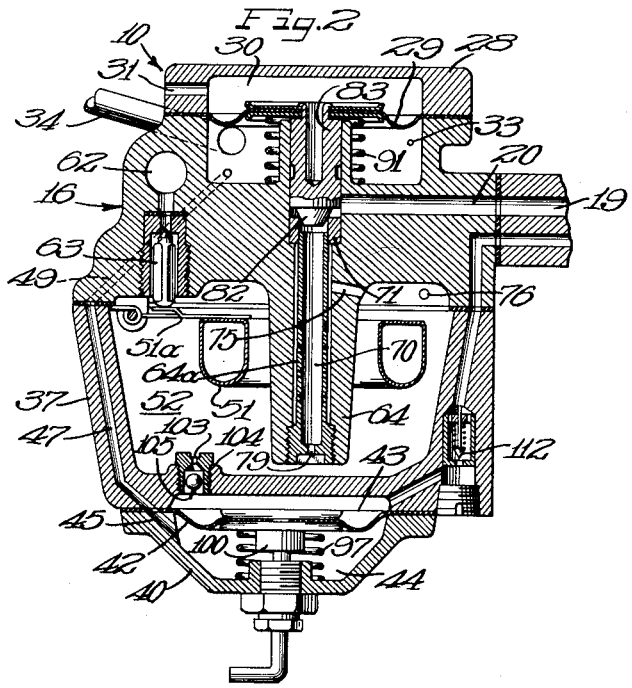
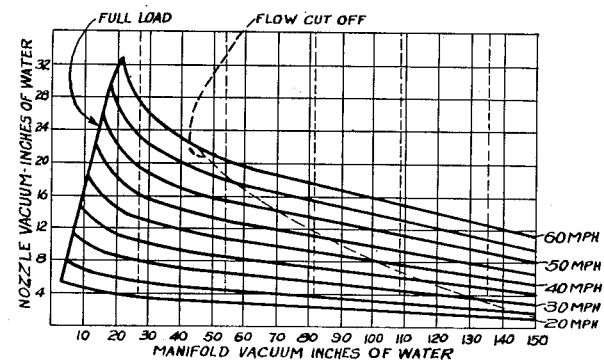
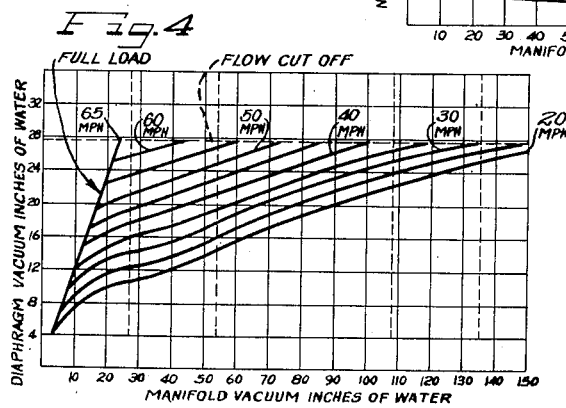
Inventor
David E. Anderson Patented Jan. 5, 1954

2,664,871

UNITED STATES PATENT OFFICE 2,664,871

SUPPLEMENTAL FUEL FEED DEVICE

David E. Andersen, Cleveland, Ohio, assignor to Thompson Products, Inc., Cleveland, Ohio, a corporation of Ohio Application July 30, 1949, Serial No. 107,720

15 Claims. (Cl. 123—127)

This invention relates to improvements in devices for feeding controlled amounts of coolant or anti-detonant fluid to the fuel intake of an internal combustion engine. Specifically, this invention has to do with a device for feeding controlled amounts of anti-detonant fluid to an engine, the operation of which device is controlled in relation to the engine speed as well as to the intake manifold vacuum.

It has been discovered that the knocking characteristics of high compression engines, particularly at part-throttle, vary considerably with speed. At low speeds detonation occurs from full load and low vacuum to part load and relatively high vacuum (8 to 12 inches of mercury) while at high speeds and part throttle the tendency to knock disappears at a relatively low vacuum (2 to 3 inches of mercury). At still higher speed there will be no tendency to knock at all.

The present devices on the market for controlling the flow of anti-detonant to an engine use manifold vacuum imposed on a spring-loaded diaphragm to open and close the valve which controls the flow. With this type of control, the flow is started at the same manifold vacuum, regardless of engine speed.

If this type of control is used on a high compression engine and adjusted so that when the engine is operating at low speed, with part throttle and relatively high vacuum (8 to 12 inches of mercury), the tendency to knock will be compensated for by an injection of anti-detonant fluid. Then, when this same engine is operating at high speed and part-throttle conditions, at the same vacuum (8 to 12 inches of mercury) anti-detonant fluid would also be supplied to the engine, although no knocking tendency is present. This, of course, becomes very uneconomical as a considerable amount of fluid will be supplied that is not needed, and may also be detrimental to best engine operation.

According to the teachings of the present invention, the injection of anti-detonant fluid is controlled by a device that is responsive to two pressures which vary with speed and load, namely, carburetor-Venturi vacuum and intake manifold vacuum. A first conduit is connected into the throat of the carburetor at the Venturi passage, while a second conduit extends into the carburetor connection to the intake manifold slightly downstream from the throttle valve. These two conduits communicate with a third conduit which leads to the vacuum chamber associated with a flexible diaphragm which controls the valve of the supplementary fuel injection device. Each of the first and second conduits has an orifice of predetermined size. By connecting the first and second conduits together, and using the proper size orifice in each branch, a differential pressure may be obtained which is then used to control the diaphragm valve in the injector.

It is then an important object of this invention to provide a device, the operation of which is controlled in relation to engine speed as well as to intake manifold vacuum, rather than in relation to manifold vacuum alone, as in present devices.

Another object of this invention is to provide a supplementary fuel feed device in which a diaphragm connected to a supplementary fuel metering valve is subjected on one side to atmospheric pressure and on the other side to a combination of Venturi-vacuum pressure and manifold-vacuum pressure.

Another object of this invention is to provide anti-detonant injection device arranged to supply the proper amount of anti-detonant fluid to suppress knock in high combustion engines under all conditions of operation, such as full load and part load, at all engine speeds.

Further features, objects and advantages of the present invention will become apparent to one skilled in the art from the following detailed description, taken in connection with the annexed sheets of drawings.

On the drawings:

Figure 2 is a vertical sectional view taken through the fuel feeding device of Figure 1, showing a second set of operating conditions of the device.

Figure 3 is a chart showing the relationship between Venturi vacuum and manifold vacuum at various speeds.

Figure 4 is a chart showing the relationship between a chosen differential pressure and the manifold vacuum for various engine speeds.

As shown on the drawings:

Figure 1:
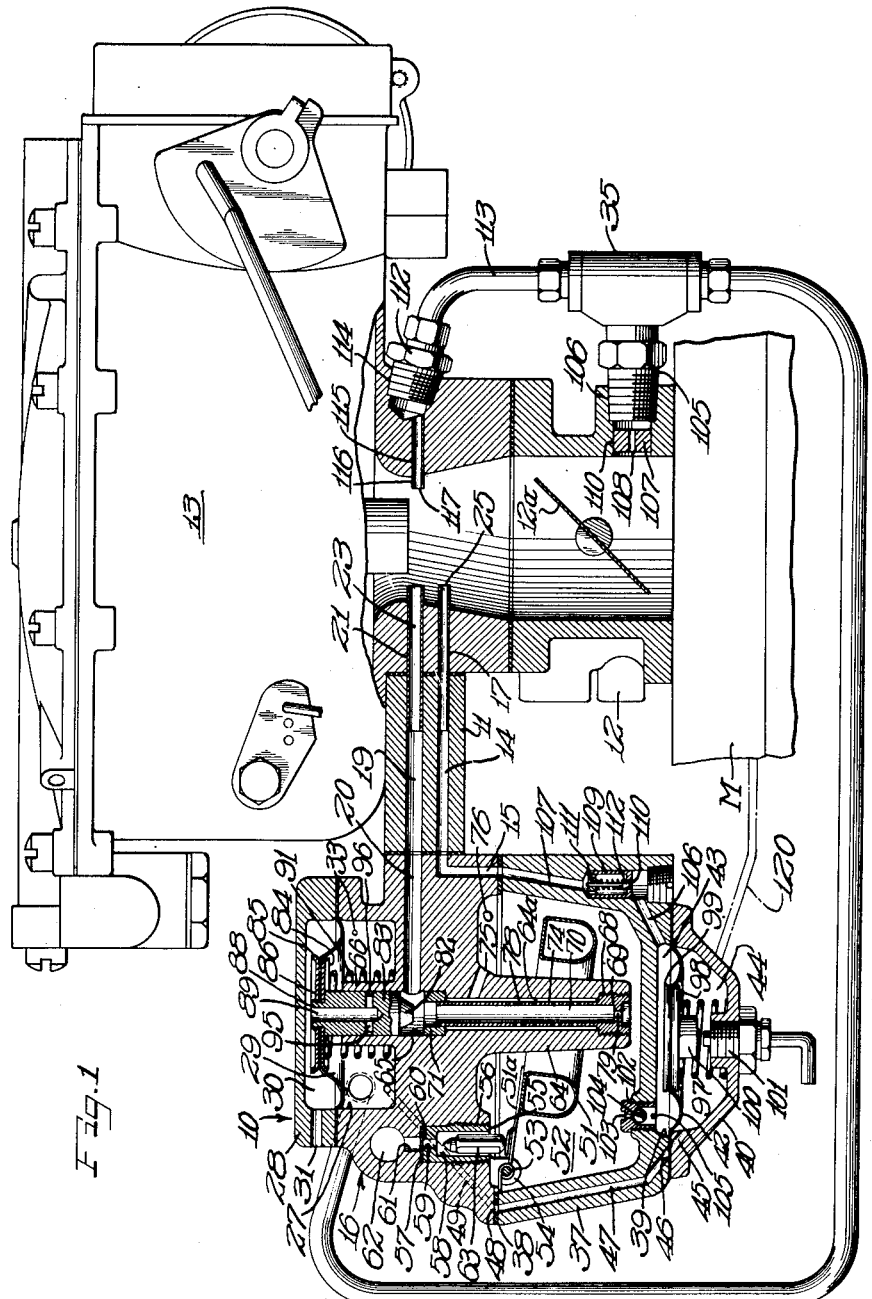
Figure 1 is a side elevational view, partly in section and partly broken away, of a supplementary fuel feeding device constructed according to the teachings of the present invention and shown connected to the engine carburetor and intake manifold connections.

In Figure 1, the reference numeral 10 designates generally a supplementary feed device according to this invention mounted by means of an adapter 11 to a carburetor 13. A throttle block 12 having a throttle valve 12a is disposed between the carburetor and the intake manifold M of the engine. The adapter 11 has a first passage 14 connecting a passage 15 in the body 16 of the feed device 10 with a passage 17 in the carburetor, and a second passage 19 connecting a passage 20 in the body 16 to a passage 21 in the carburetor. A tubular insert 23 is disposed in the aligned passages 19 and 21 and extends into the Venturi throat portion of the carburetor, while a tubular insert 25 connects the aligned passages 14 and 17 and extends into the throat of the carburetor immediately below the tube 23.

The supplementary fuel feed device 10 includes a main body portion 16 having a recess 27 in the upper surface thereof, with a cover member 28 suitably secured across said recess. A flexible diaphragm 29 is secured at its marginal edges between the body 16 and the cover 28 and extends across the recess 27, defining an upper chamber 30 vented to atmosphere by a vent hole 31 in the cover, and a lower vacuum chamber 33 connected by a tube 34 to a fitting 35 which acts as a vacuum header, the function of which will be described hereinafter.

A cup-shaped lower casing member 37 is held in sealing engagement with the body 16 of the feed device 10, with a gasket 38 of resilient material therebetween, by means of a plurality of cap screws (not shown).

The lower surface of the casing portion 37 has a recess 39 which is enclosed by a closure plate 40 secured to the casing 37 by any suitable means.

A diaphragm 42 is disposed across the recess 39, having marginal edges secured between the casing 37 and the closure plate 40. The diaphragm, in connection with the casing 37 and the closure plate 40, defines an upper fluid storage compartment 43 and a lower vacuum chamber 44 which is in communication with the upper vacuum chamber 33 by means of a passageway 45 in the closure plate 40, an aperture 46 in the diaphragm 42, a passageway 47 in the casing 37, an aperture 48 in the gasket 38, and a passageway 49 in the body 16.

An annular hollow float 51 is pivotally mounted in a central chamber 52 of the cup-shaped casing 37 by means of a pin 53 on a depending flange 54 secured to the body 16. A tubular valve housing 55 is threaded into an opening 56 in the body 16, having an inner end portion bottomed against the end wall of the opening 56 with a gasket 57 therebetween. The tubular housing 55 has a central chamber 58 with a restricted orifice 59 at one end. The orifice 59 is in alignment with a central passage 60 in the gasket 57 and a passage 61 in the body 16, affording communication between the chamber 58 and a passage 62 connected to a source of anti-detonant fuel.

A valve 63 is slidably disposed in the chamber 58 and has a conical seating surface movable into the restricted orifice 59 and coacting with the edges thereof to control flow of fluid through the housing into the float chamber 52. An arm 51a of the float 51 acts on the lower end of the valve 63 to move the conical seating surface of the valve into the orifice 59 to stop the flow of fluid into the chamber 52 when the fluid in the chamber is at the desired level.

A lower boss 64 depending from the body portion 16 extends downwardly into the float chamber 52 and has a central bore or passage 64a in communication with a central passage 65 of substantially larger diameter in an upper boss 66 of the body 16 which extends upwardly into the vacuum chamber 33. The lower boss 64 terminates in an internally threaded portion 68 arranged to receive the threaded lower end of a tubular vent member 69 which is centrally disposed in the passage 64a and has a central bore 70. A spacer ring 71 is disposed about the tubular member 69 at the upper end thereof where the passage 64a merges with the larger passage 65 of the upper boss 66. It will thus be seen that the lower end of the passage 65 forms a discharge chamber for the fluid leaving the passage 70. The passage 20 in the block 16 affords communication between the passage 65 and the aligned passages 19 and 21 leading to the Venturi opening of the carburetor.

Since the outer diameter of the tubular vent member 69 is less than the diameter of the bore 64a, there is defined between the vent member and the walls of the bore an annular passage 74 which is in communication with that portion of the float chamber 52 above the shut-off position of the float by means of a slanted passage 75. This upper portion of the float chamber 52 is vented to atmosphere through an opening 76 in the body 16.

To establish communication between the annular passage 74 around the vent member 69 and the central passage 70 of the vent member 69 there is provided a series of radially extending passages 78 in the wall of the vent member 69. The passageway in the center of the tubular vent member 69 is also in communication with the liquid in the float chamber 52 through a restricted passageway or orifice 79 in the threaded end of the tube 69.

Liquid in the float chamber 52 will, of course, pass upwardly through the passageway 79 into the central portion of the tubular vent member 69 and stand at a height therein corresponding to the height of the liquid in the float chamber.

The metering valve of the present invention comprises a segmental conical seating member 82 that extends downwardly from a cylindrical block 83 that is slidably disposed in the enlarged bore 65 of the upper boss 66. The seating member 82 coacts with the upper edges of the hole in the spacer ring 71, as shown in Figure 2, to act as a shut-off valve.

The central portion of the diaphragm 29 is held between washers 84 and 85 against a shoulder 86 of the block 83 by means of a peened-over end 88. Thus, flexing movement of the diaphragm 29 will cause the cylindrical block 83 to slide up and down in the central bore 65, moving the conical seating member 82 toward and away from the spacer ring 71.

The cylindrical block 83 has a central passage 89 in its upper portion which communicates with a radial passage 95, which in turn is in communication with an annular groove 96 on the outer periphery of the block 83. It will, of course, be recognized that should the peripheral surfaces of the block 83 or the surfaces of the upstanding boss 66 become worn so that liquid can pass upwardly between the boss 66 and the block 83, the suction in the chamber 33 caused by the connection of the chamber 33 with the tube 34 leading to the vacuum connection would cause liquid to be drawn off through these slight openings into the vacuum chamber 33. However, since the annular groove 96 is vented to atmosphere through the passage 89 and the vented chamber 30, the effect of the vacuum between the surfaces of the block 83 and the boss 66 is broken at this point. Therefore, the vacuum will not be effective to draw liquid up past these surfaces.

A coil spring 91 is disposed in the vacuum chamber 33 between the main body 16 and the lower washer member 84.

Downward movement of the diaphragm 29 and the associated cylindrical block 83 is effected by suction pressure in the suction manifold 35 and the tube 34 which communicates the chamber 33 with the block 83. The spring 91 resists the downward movement of the diaphragm and is strong enough to overcome the pull of the diaphragm 29 when there is low vacuum in the intake manifold, thus permitting anti-detonant fluid to be drawn through the restricted orifice 78 and the passages 78, 20, 19 and 23, into the fuel intake passage of the engine. Under conditions of high vacuum, the spring permits the diaphragm to be progressively pulled down until the conical end 82 of the block 83 is seated on the top edge of the hole in the spacer ring 71, thus shutting off the supply of anti-detonant fluid.

The lower diaphragm 42, which is disposed between the fluid storage chamber 43 and the lower vacuum chamber 44, is arranged to flex against the compression of a spring 97 when the vacuum in chamber 44 is increased. The diaphragm has a central portion comprising two oppositely disposed washer members 98 and 99 and a depending stop member 100 which is arranged to abut against an adjustable stop 101 threaded into the lower end of the cover portion 40 to limit the downward movement of the diaphragm.

As the diaphragm 42 is flexed against the action of the spring 97, fluid enters the storage chamber 43 through a ball check valve assembly including a plug member 102 with a restricted orifice 103, a ball member 104 and a stop pin 105 which restricts the movement of the ball 104 away from the orifice 103. When the ball moves away from the orifice 103, fluid will flow into the storage chamber 43. A passage 106 in the body portion 37 communicates the storage chamber 43 with a passage 107 which is in communication with passageway 15 in the body 16. A check valve assembly is disposed between passages 106 and 107 and comprises a sleeve valve body 109 having an orifice 110 at one end thereof, and a limit bar 111 disposed across the central passageway of the valve body. A spring urged valve member 112 is arranged in the passage to move between the port 110 and the stop 111 to permit fluid to flow from the storage chamber 43 to the insert 25, and then into the intake of the engine.

In operation, when the engine attains a high vacuum running condition, the diaphragm 42 will be flexed against the compression of the spring 97, and fluid will be stored in the chamber 43 above the diaphragm. This condition is indicated in Figure 2, where the throttle valve is partly open. Then, when a sudden low vacuum condition arises in the intake manifold as, for example, when the throttle valve is suddenly moved to wide open position, the spring will suddenly overcome the vacuum pressure in the chamber 44 and flex the diaphragm to compress the fluid through the passages 106, 107, 15 and 14, and through the insert 25 into the carburetor.

Thus, this lower storage chamber assembly provides a supplementary fuel feed device including the flexible diaphragm which is moved to a spring-loaded position by a high vacuum running condition of the engine and is released for injecting a predetermined quantity of fluid into the fuel intake of the engine in response to a sudden low vacuum condition of the engine. By employing springs 97 of varying load characteristics, the pressure at which this supplementary jet of fuel is injected into the carburetor can be regulated. Further, by using a variable stop device 100—101, the amount of liquid which would be drawn into the supply chamber 43 can be controlled, as well as the length of the stroke of the diaphragm in response to the action of the spring.

It is a feature of this invention that the vacuum in the line 34 and in the vacuum chamber 33 which is effective to move the diaphragm 29 to open and close the metering valve 82, is a function not only of the pressure in the intake manifold of the engine but also a function of the vacuum in the Venturi throat portion of the carburetor. To attain this differential pressure there is provided a fitting 105 which is connected to the fitting 35 and is threaded into an opening 106 in the intake manifold which communicates with the fuel inlet connection to the engine just downstream from the butterfly valve. An orifice 107 having a predetermined restricted opening 108 therethrough is fitted into an inner smooth portion 110 of the aperture 106, as by a press fit.

A second fitting 112 is connected to the fitting 35 by means of a tube 113 and is threaded into an opening 114 in the body of the carburetor. The opening 114 is in communication with the throat portion of the carburetor by means of a passage 115 which carries a tubular orifice member 116 having a predetermined restricted opening 117 therein. Thus, the fitting 35 which is connected to the tube 34 leading to the vacuum chamber 33 of the supplementary fuel feed device 10 is in communication through restricted orifice members with both the intake manifold of the engine and the Venturi throat portion of the carburetor.

The purpose of using both the Venturi vacuum and the manifold vacuum to move the diaphragm of the feed device is to obtain a differential pressure that will reflect engine speed as well as manifold vacuum for controlling the diaphragm.

In the chart reproduced in Figure 3 it will be seen that for a full load operating condition of a typical high compression engine nozzle both the Venturi vacuum and the manifold vacuum increase as the speed increases. Throughout the speed range the Venturi vacuum is higher than the vacuum in the intake manifold. The diaphragm control differential vacuum, which will be used to control the movement of the diaphragm 29 in the feed device 10 can be made to fall anywhere in between the Venturi and manifold vacuum, depending upon the relative sizes of the two orifices.

From this chart it will be seen also that at part loads the Venturi vacuum decreases from the full load position, while the manifold vacuum increases. At the lower speeds this rate of decrease is lower than at high speeds. The parts of the curve below the dotted "flow cut-off" line indicates the value of the aspirating pressures at which the feed device or injector is operating. At 50 M. P. H. and 50 inches of water manifold vacuum, the nozzle vacuum is equal to 16 inches of water, therefore flow of supplementary fuel occurs. At 80 inches there will be no flow, even though the aspirating pressure is higher than the cut-off point.

By connecting the Venturi vacuum and the manifold vacuum together, and using the proper size of orifice in each branch, a differential pressure will be obtained which can be used to control the diaphragm valve in the injector.

Referring to the chart of Figure 4 it will be seen that differential vacuums at various speeds are plotted against manifold vacuum. The dotted line called "flow cut-off" indicates, in this chart, the selected differential diaphragm vacuum at which the flow of supplementary fuel will stop. This is the pressure at which the diaphragm valve is set to close. It will be seen that at 30 M. P. H. the valve closes at approximately 133 inches of water manifold vacuum, while at 40 M. P. M. valve closes at 100 inches, and at 60 M. P. H. at 44 inches. At 65 M. P. H. there will be no flow under any condition of engine operation as the differential pressure equals the force of the diaphragm and the spring, and so the valve is closed. Thus, for high speed, low manifold vacuums there will be no supplementary fuel injection. As previously mentioned, for high compression engines the tendency to knock at high speeds disappears at relatively low manifold vacuum. Thus, clearly seen in Figure 4, by properly choosing the differential diaphragm vacuum pressure the supplementary fuel injection will be shut off for high speed operation at relatively low vacuum pressures.

From the foregoing description it will be seen that there is provided in this invention a novel means of controlling the feeding of supplementary fuel to the intake of an internal combustion engine. By using a differential pressure determined by the size of the orifices in a line leading from the Venturi chamber of the carburetor and a line leading from the intake manifold of the engine, the flexing of the diaphragm in response to operation of the engine can be correlated with the speed of the engine as well as the intake vacuum. This invention also provides means depending upon this differential pressure for suddenly injecting an additional charge of supplementary fuel under extreme sudden low vacuum conditions.

Alternately, the auxiliary pump means provided by the diaphragm 42 may be operated solely by manifold vacuum instead of by the differential pressure. In this case a tube 120, shown in dot-dash lines in Figure 1, will connect the vacuum chamber 44 to the intake manifold M.

The term "manifold" as used herein includes as an equivalent, the intake conduit means beyond the throttle valve in the fuel intake of a single cylinder engine as well as the intake manifold conduit of a multi-cylinder engine.

It will be understood that modifications and variations may be effected without departing from the scope of the novel concepts of the present invention.

I claim as my invention:

1. A device for supplementing the fuel feed of a carburetor intake of an internal combustion engine comprising a housing defining a float chamber and having upper and lower substantially central bosses, aligned top and bottom bores extending through said bosses, a restricted orifice in said bottom bore, said top bore providing a discharge chamber at the upper end of said bottom bore, said housing having a discharge passageway in communication at one end with the fuel intake of the engine and the other end in communication with said discharge chamber, said housing having a first diaphragm-covered vacuum chamber subjected to carburetor Venturi vacuum and to engine manifold vacuum, a block connected to said first diaphragm and slidable in said top bore, said block having an end seatable against the top of said bottom bore to close the bore, spring means tending to move said end of the block away from said top of the bottom bore, a second diaphragm-covered vacuum chamber subjected to reduced pressure from said first vacuum chamber, a compartment in said housing above said second chamber and bottomed by the diaphragm of said second chamber, said compartment being in flow communication with said float chamber and with said fuel intake of said engine, a spring in said second chamber urging said diaphragm cover thereof toward said compartment to decrease the effective size of said compartment, and a check valve permitting filling of said compartment from said float chamber when the diaphragm cover of the second chamber is depressed against the action of said spring in response to reduction in pressure in said second chamber and effective to close said compartment to permit the diaphragm cover of the second chamber to force fluid from the compartment into said fuel intake of the engine when said spring flexes said diaphragm cover of the second chamber to decrease the size of said compartment.

2. A device for supplementing the fuel feed of a carburetor comprising a casing for containing a body of supplementary fuel, a first conduit for connecting said body of fuel to the Venturi passage of the carburetor, a first valve means located in said first conduit for controlling the flow of supplementary fuel therethrough, a diaphragm for controlling said valve in accordance with differential pressure conditions, one side of said diaphragm being subjected to atmospheric and the other side subjected to carburetor Venturi pressure and to manifold pressure, said differential pressure condition urging said valve to closed position, a spring urging said valve to open position against the resistance of said diaphragm, said spring being sufficient to overcome the resistance of said diaphragm at relatively low vacuum only, a second conduit connecting said body of fuel to the venturi, and second valve means located in said second conduit for controlling the flow of supplementary fuel therethrough, and a second diaphragm arranged to flex in one direction in response to increasing vacuum in said manifold and arranged to be flexed in an opposite direction when said manifold vacuum drops, said flexing in the opposite direction being effective to positively propel a charge of fluid through said second discharge conduit to the fuel intake of the engine.

3. A fluid feed device for delivering supplementary fuel to the intake manifold of an engine which receives its main fuel supply through a carburetor comprising a housing defining first and second fluid storage compartments having discharge conduits arranged for delivering fluid to the intake of the engine and a first and second vacuum chamber, a vacuum-controlled diaphragm in each chamber, a valve in the discharge conduit of said first storage compartment and connected to the diaphragm in said first vacuum chamber for movement therewith to control flow of fluid through the associated discharge conduit, said valve being movable to open said conduit as the vacuum in said first chamber decreases, a spring in said second vacuum chamber resisting movement of the diaphragm therein as it flexes in response to an increase in vacuum in the chamber and arranged to discharge fluid from said second storage compartment when the vacuum decreases a predetermined amount, and means for simultaneously subjecting said first and second vacuum chambers to a differential pressure of a value between the pressure in the Venturi throat of the carburetor and the pressure in the intake manifold of the engine.

4. In a fuel feed device for supplementing the fuel feed of a Venturi throat equipped carburetor to the intake manifold of an engine, a housing, a fuel reservoir in said housing, said housing having a vacuum chamber and a passageway in communication with said reservoir and arranged to be connected to the fuel intake of the engine, a valve in said passageway controlling the flow of fuel therethrough, a flexible diaphragm in said housing controlling said valve and having one face subjected to reduced pressure in said vacuum chamber to move the valve toward closed position and the opposite face subject to atmospheric pressure, and means for subjecting said vacuum chamber to a differential pressure of a value between the pressure in the Venturi throat of the carburetor and the pressure in the intake manifold of the engine.

5. In a fuel feed device for supplementing the fuel feed of a Venturi throat equipped carburetor to the intake manifold of an engine, a housing, a fuel reservoir in said housing, said housing having a vacuum chamber and a passageway in communication with said reservoir and arranged to be connected to the fuel intake of an engine, a valve in said passageway controlling the flow of fuel therethrough, a flexible diaphragm in said housing connected to said valve and having one face subjected to reduced pressure in said vacuum chamber for closing the valve under the influence of the reduced pressure and the opposite face subjected to atmospheric pressure, a conduit connecting said vacuum chamber to separate lines leading respectively from the Venturi throat of the carburetor and from the intake manifold of the engine, and an orifice member in each separate line having apertures therethrough of predetermined size to regulate the pressure in said conduit to a value between the Venturi throat vacuum and the intake manifold vacuum.

6. In combination with a Venturi throat equipped carburetor and the intake manifold of an engine, a supplementary fuel feed device comprising a housing, a fuel reservoir in said housing, said housing having a vacuum chamber and a passageway in communication with said reservoir and leading exteriorly of said housing, a conduit connecting said passageway to the fuel intake of an engine, a valve in said passageway controlling flow of fluid therethrough, a vacuum responsive diaphragm in said vacuum chamber and connected to said valve for urging the valve into closed position, and a second conduit connecting said vacuum chamber to separate vacuum lines leading respectively from the Venturi throat of the carburetor and from the intake manifold of the engine.

7. In combination with a Venturi throat equipped carburetor, a supplementary fuel feed device comprising a housing, a fuel reservoir in said housing, said housing having a vacuum chamber and a passageway in communication with said reservoir and leadnig exteriorly of said housing, a conduit connecting said passageway to the fuel intake of an engine, a valve in said passageway controlling flow of fluid therethrough from said reservoir, a vacuum responsive diaphragm in said vacuum chamber and connected to said valve to move the valve toward closed position under the influence of vacuum in said vacuum chamber, a second conduit connecting said vacuum chamber to separate vacuum passages leading respectively from the Venturi throat of the carburetor and from the intake manifold of the engine, and orifice members in each vacuum line having openings of predetermined size therethrough to proportion the effect of each source of vacuum on the pressure in the vacuum chamber.

8. In combination with a carburetor, a supplementary fuel feed device comprising a housing, a fuel reservoir in said housing, said housing having a vacuum chamber and a passageway in communication with said reservoir and leading exteriorly of said housing, a conduit connecting said passageway to the fuel intake of an engine, a valve in said passageway controlling flow of fluid therethrough, a vacuum responsive diaphragm in said vacuum chamber and connected to said valve for biasing the valve toward closed position under the influence of increasing vacuum in said vacuum chamber, and a second conduit connecting said vacuum chamber to the intake manifold of the engine and to a source of vacuum that decreases as load is removed from the engine.

9. In a feed device for an internal combustion engine including first and second mechanisms for delivering fluid to the engine, a vacuum-sensitive control member for placing the second mechanism in operation, a Venturi throat and throttle valve-equipped engine intake receiving fuel from both mechanisms, and means venting the control member to both the Venturi throat and the downstream side of the throttle valve thereby creating a differential vacuum for actuating the control member and rendering the mechanism sensitive to engine speed as well as vacuum.

10. A device for supplying auxiliary antiknock fluid to an internal combustion engine, comprising in combination a container for said fluid with a passage opening therefrom to the fuel intake system of the engine, regulating means for controlling the amount of fluid entering said passage, said regulating means being responsive to the differential vacuum created by venting together the vacuum dependent on the amount of air flowing to the induction system of the engine and the vacuum in the air-fuel intake passage, increases of said differential vacuums having the same directional effect on said regulating means, and decreases in said differential vacuums having the opposite directional effect.

11. A device for supplying auxiliary antiknock fluid to an internal combustion engine having throttle means for controlling the main fuel supply, comprising in combination a container for said fluid with a passage opening therefrom to the fuel intake system of the engine, regulating means for controlling the amount of fluid entering said passage, said regulating means being responsive to the differential vacuums created by venting together the vacuum obtained before said throttle dependent on air flow and the vacuum obtained after the throttle, increases in said differential vacuums tending to decrease the flow of fluid entering said passage and decreases in said differential vacuums tending to increase said flow of fluid.

12. A device for supplying auxiliary antiknock fluid to an internal combustion engine comprising in combination a container for said fluid with a passage opening therefrom to the fuel intake system of the engine, regulating means for controlling the amount of fluid entering said passage, said regulating means being responsive to the effect of differential vacuums created by venting together the vacuum in the carburetor venturi and the vacuum in the air-fuel intake manifold and tending to increase the flow of fluid through said passage as said differential vacuums decrease and to decrease the flow of fluid through said passage as said differential vacuums increase.

13. A method for changing the antiknock rating of a fuel for an internal combustion engine in accordance with the antiknock requirements of the engine under different operating conditions which comprises supplying to said engine a primary fuel of insufficient antiknock rating to provide for all operating conditions, and admixing with said primary fuel an auxiliary antiknock fluid when the operating conditions of the engine so require, the amount of auxiliary fluid admixed as aforesaid being controlled by the effect of differential vacuums produced by venting together the vacuum dependent on the amount of air flowing to the carburetor and the vacuum in the air-fuel intake manifold, said effect operating in such manner that as said differential vacuums decrease it tends to increase the amount of auxiliary fluid admixed with the primary fuel and as said differential vacuums increase it tends to decrease the amount of auxiliary fluid admixed with the primary fuel.

14. A device for supplying auxiliary antiknock fluid to an internal combustion engine comprising in combination a container for said fluid with a passage opening therefrom to the fuel intake system of the engine, regulating means for controlling the amount of fluid entering said passage, said regulating means being responsive to the combined effect of the vacuum in the carburetor venturi and the vacuum in the air fuel intake manifold and tending to increase the flow of fluid through said passage as either of said vacuums decreases and to decrease the flow of fluid through said passage as either of said vacuums increases, a diaphragm-covered chamber in said container vented to said regulating means, a compartment communicating with said container bottomed by the diaphragm cover for said chamber, check valve means accommodating flow of fluid from said container into said compartment, means providing a discharge passageway for said compartment and opening therefrom to said fuel intake system of the engine, and a spring urging the diaphragm cover of said chamber to decrease the size of said compartment for forcing fluid therefrom through said passageway whenever said combined effect of the vacuum is insufficient to hold the diaphragm cover for collapsing said spring.

15. In a feed device for an internal combustion engine including first and second mechanisms for delivering fluid to the engine, a vacuum-sensitive control member for placing the second mechanism in operation, a Venturi throat and throttle valve equipped engine intake receiving fuel from both mechanisms, and means venting the control member to both the Venturi throat and the downstream side of the throttle valve thereby creating a differential vacuum for actuating the control member, a diaphragm pump communicating with said engine intake and receiving fluid from said second mechanism, and means venting the diaphragm pump to said differential vacuum for actuating the pump to receive fluid from the second mechanism whenever the differential vacuum is above a predeterminend amount and for discharging the fluid from the pump into the engine intake whenever the vacuum decreases below said predetermined amount.

DAVID E. ANDERSON.

References Cited in the file of this patent

UNITED STATES PATENTS

| Number | Name | Date |
|---|---|---|
| 2,316,327 | Garretson | Apr. 13, 1943 |
| 2,377,607 | Bodine | June 5, 1945 |
| 2,447,791 | Barfod | Aug. 24, 1948 |
| 2,477,481 | Ericson | July 26, 1949 |
| 2,551,719 | Ball | May 8, 1951 |
| 2,572,169 | Mallory | Oct. 23, 1951 |
| 2,616,404 | Bartholomew | Nov. 4, 1952 |